United States Patent [19]

Zijderveld et al.

[11] Patent Number: 5,084,513

[45] Date of Patent: Jan. 28, 1992

[54] PROCESS FOR PREPARATION OF STABLE INTERPENETRATING POLYMER BLENDS, COMPRISING A POLY(VINYL AROMATIC) POLYMER PHASE AND A POLY(ALKYLENE) PHASE

[75] Inventors: Johannes M. Zijderveld, Breda; Philippe M. Scheerlinck, Diechem; Hugo A. A. Berghmans, Heverlee-Leuven, both of Belgium

[73] Assignee: Shell Internationale Research Maatschappij B.V., Netherlands

[21] Appl. No.: 477,070

[22] Filed: Feb. 9, 1990

[30] Foreign Application Priority Data

Feb. 10, 1989 [GB] United Kingdom ............... 8903010

[51] Int. Cl.$^5$ ............................................. C08L 9/06
[52] U.S. Cl. ......................................... 525/98; 525/132; 525/319; 525/320; 525/322; 525/324; 525/903
[58] Field of Search ............ 521/59; 524/505, 536; 525/243, 319, 320, 322, 324, 903, 98, 132

[56] References Cited

U.S. PATENT DOCUMENTS

| | | | |
|---|---|---|---|
| 3,224,984 | 12/1965 | Roper et al. | 260/2.5 |
| 3,398,105 | 8/1968 | Roper et al. | 260/2.5 |
| 3,468,820 | 9/1969 | Buchholz et al. | 260/2.5 |
| 3,743,611 | 7/1973 | Muroi et al. | 260/2.5 |
| 3,959,189 | 5/1976 | Kitamori | 260/2.5 |
| 3,972,843 | 8/1976 | Jong | 260/2.5 |
| 4,269,871 | 3/1981 | Blommers et al. | 521/59 |
| 4,303,756 | 12/1981 | Kajimura | 521/59 |
| 4,303,757 | 12/1981 | Kajimura et al. | 521/59 |
| 4,525,486 | 6/1985 | Kobayashi et al. | 521/59 |
| 4,647,593 | 3/1987 | Bartosiak et al. | 521/60 |
| 4,769,393 | 9/1988 | Kuwabara et al. | 521/59 |
| 4,912,172 | 3/1990 | Hallgren et al. | 525/396 |

OTHER PUBLICATIONS

Vysokomol. Soedin., Ser. A 28(2), 398–405, 1986 (Volynskii et al.).

Primary Examiner—Joseph L. Schofer
Assistant Examiner—R. H. Delmendo

[57] ABSTRACT

A process for the manufacture of stable interpenetrating polymer blend networks is provided, comprising the preparation of a gel of a poly(alkylene) polymer by dissolving it in a mixture of one or more organic solvents and one or more vinyl aromatic monomers, optionally mixed with a compatible monomer, cooling this solution to a temperature of at most 80° C., adding of a radical forming initiator for the polymerization of the vinyl aromatic monomer(s), homogenizig the solution, cooling the solution to a temperature to obtain gelation of the polyalkylene polymer in the solvent mixture, followed by heating the obtained gel to a temperature of at least 80° C. and subsequently polymerization of the vinyl aromatic monomer(s) in bulk or suspending the heated solution in a vigorously stirred aqueous medium of a lower temperature to obtain gelation and polymerizing the suspended gel into polymer blend beads, stable interpenetrating polymer blend networks and intermediate gel used therewith.

34 Claims, 2 Drawing Sheets

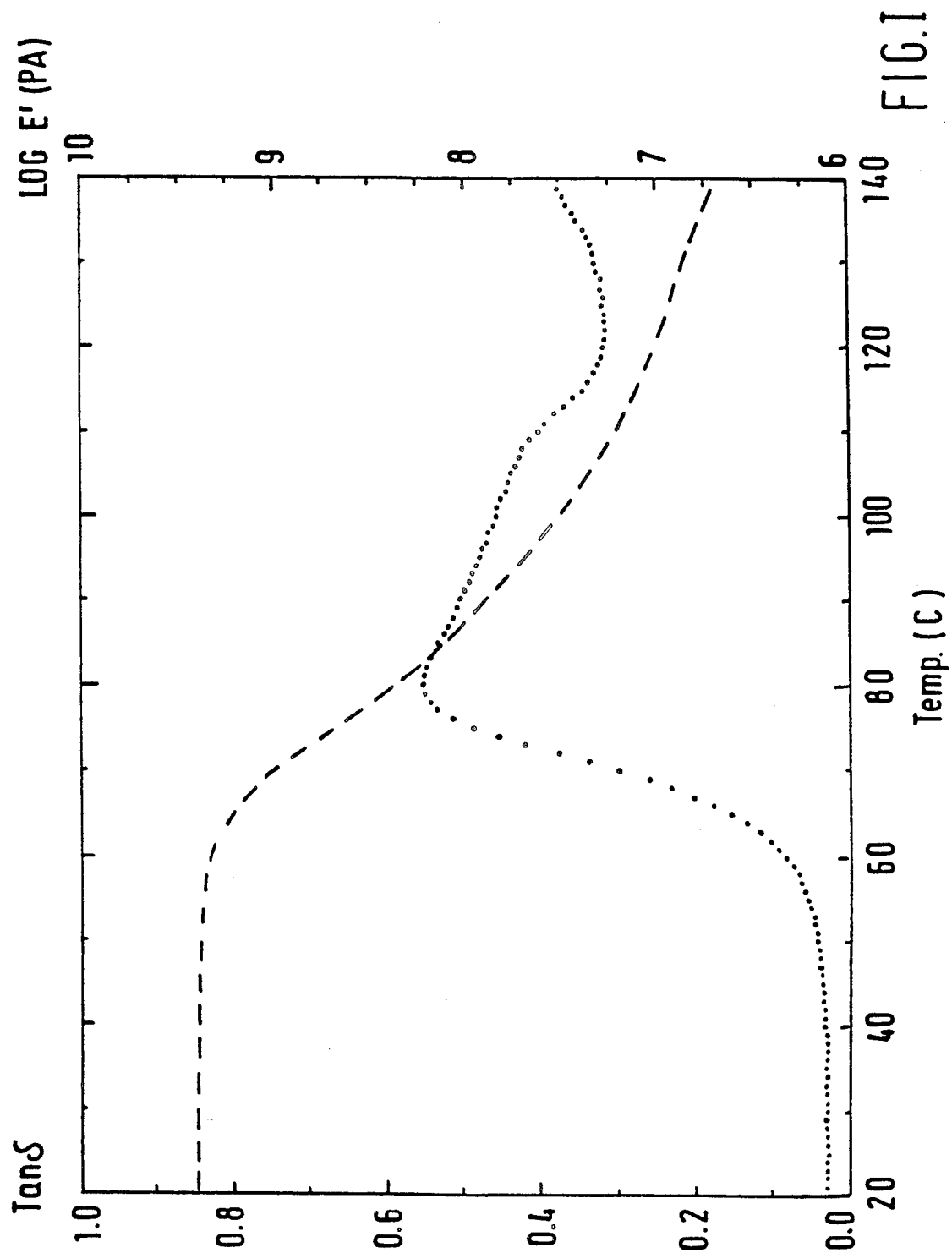

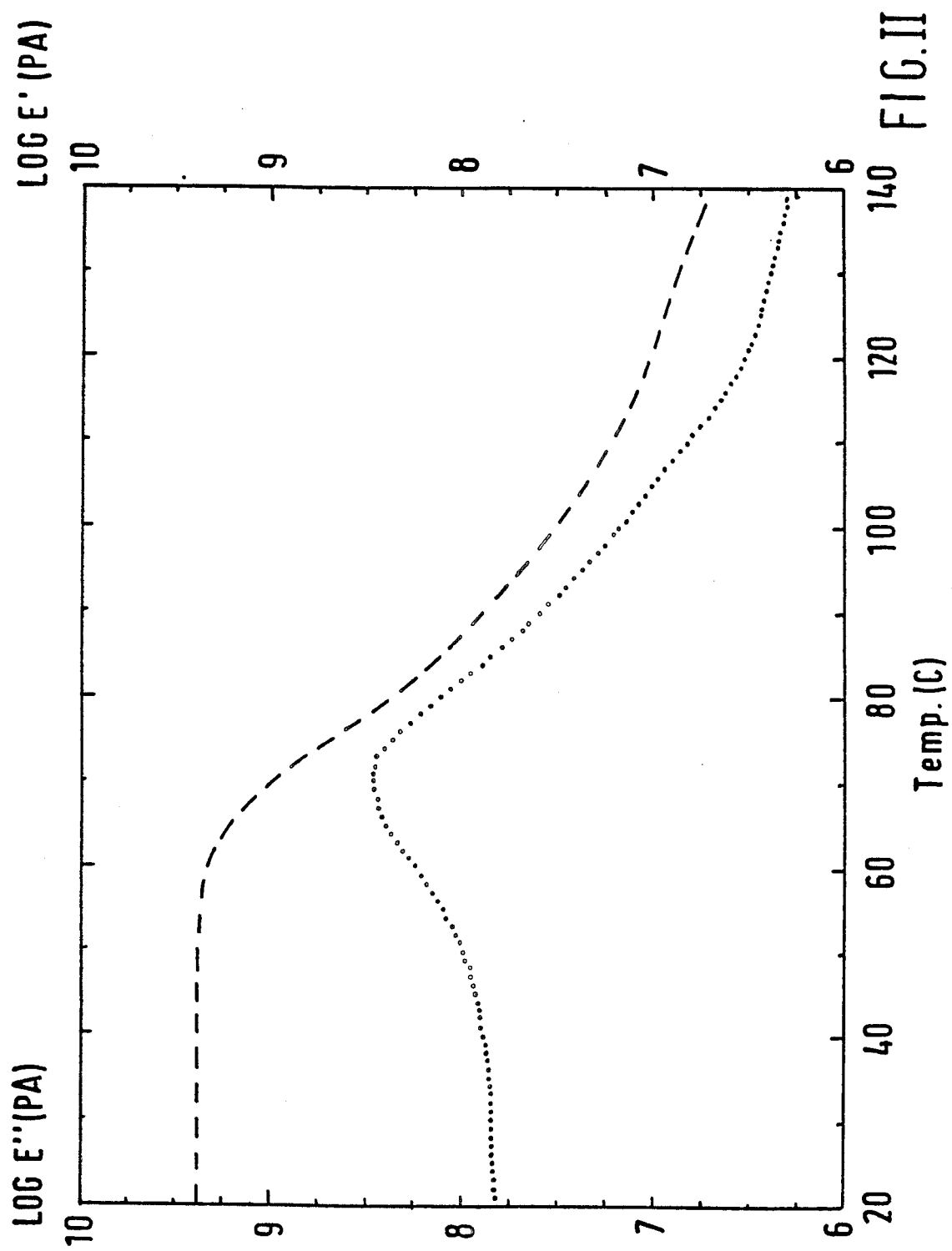

PROCESS FOR PREPARATION OF STABLE INTERPENETRATING POLYMER BLENDS, COMPRISING A POLY(VINYL AROMATIC) POLYMER PHASE AND A POLY(ALKYLENE) PHASE

The invention is directed to a process for preparation of stable interpenetrating polymer blends, comprising a poly(vinyl aromatic) polymer phase and a poly(alkylene) phase., and to stable interpenetrating polymer networks obtainable therewith.

It is known e.g. from Paul D. R. and Barlow J.W., J. Macromol, Sci., Rev. Macromol. Chem., 18, 109 (1980) and Krause S. in "Polymer Blends", 1, 66, Paul D. R. and Newman S. Ed., Academic Press, N.Y. (1978) that polyalkylene polymers and atactic polystyrene polymer are completely incompatible and that blends of these polymers, which were prepared up to now were heterogeneous and showed the two $T_g$ values of the pure polymers due to the immiscibility of them.

In order to obtain polymer blends, showing an improved combination of characteristics, several efforts were made to mix these polymers on a molecular scale to obtain an interpenetrating polymer network, as e.g. disclosed in Vysokomol. Soyed, Ser. A 28(2), 398–405, Volynskii, A. L. et al, Lomonosov State Univ., Moscow, Structure and mechanical properties of polymer composites based on isotactic polypropylene prepared by in situ polymerization and study of their structure.

This publication actually discloses the preparation of a polymer composite by in situ polymerization by selection of a polymer-liquid monomer pair that will be capable of limited swelling. Moreover, it is clearly taught in this publication that crystallizing polymers capable of limited swelling in liquids with which they are compatible are to be used, since a crystallite network that is stable toward the action of solvent will prevent them from going completely into solution. Further teachings are that equilibrium degrees of swelling in systems of this type do not normally exceed 10% for polymers such as polyethylene or polypropylene.

Therefore, composites of this sort appeared unattractive for practical applications, which situation could only be improved in a limited degree by deformation (stretching) of crystalline polymer in contact with plasticizing liquid media like n-heptane.

However, the structure of such obtained polymer blend composites and the characteristics related to them could not meet the present requirements and disappeared during inevitable further processing and/or shaping the finally desired articles due to segregation after thermal stress.

On the other hand, an attempt was made to improve the characteristics by preparation of foamable thermoplastic beads, comprising an aliphatic monoolefin polymer (e.g. polyethylene), a foaming agent having a boiling point below the softening point of this polymer and acting as non-solvent for this polymer under the heating required for foaming, and another thermoplastic resin having an affinity for said foaming agent at temperatures for storing the beads, a solvent for the resin at temperatures above room temperature and a copolymerizable vinyl monomer, as was known from e.g. U.S. Pat. No. 3,743,611.

However this patent teaches actually crosslinking a monolefin polymer in order to improve the impregnation with foaming agent.

The preparation of foamable beads containing a polyalkylene and a poly(vinyl aromatic) polymer is also disclosed in e.g. U.S. Pat. Nos. 4,769,393; 4,525,486; 3,959,189; 4,303,756; 4,303,757 and 4,647,593.

The herein described methods have in common the impregnation of crosslinked polyalkylene polymers with a vinyl aromatic monomer. However, these obtained polymer blends aiming at the formation of interpenetrating networks could not meet the presently required stable characteristics.

Therefore there is still a strong need for interpenetrating polymer networks based on the hereinbefore mentioned types of polymers, which can be maintained under the conditions of processing and/or shaping articles and which exhibit the desired improved characteristics.

More particularly there is a strong need for stable interpenetrating polymer blend networks, having a poly(vinyl aromatic) polymer phase and a poly(alkylene) polymer phase, which is maintained during the manufacture of optionally expandable beads of such polymer blends and during the subsequent foaming and/or fusion into the desired articles, and which imparts to these articles attractive characteristics e.g. shock absorbance and/or thermal stability.

It is an object of the present invention to provide such interpenetrating polymer networks.

As a result of extensive research and experimentation a process for the manufacture of stable interpenetrating polymer blend networks, comprising a poly(vinyl aromatic) polymer phase and a poly(alklylene) polymer phase, was surprisingly found. This process comprises the preparation of a gel of a poly(alkylene) polymer by dissolving it in a mixture of one or more organic solvents and one or more vinyl aromatic monomers, optionally mixed with a compatible polymer, cooling this solution to a temperature of at most 80° C., adding a radical forming initiator for the polymerization of the vinyl aromatic monomer(s), homogenizing the solution, cooling the solution to a temperature to obtain gelation of the polyalkylene polymer in the solvent mixture, followed by heating the obtained gel to a temperature of at least 80° C. and causing polymerization of the vinyl aromatic monomer(s) in bulk, or suspending the solution in a vigorously stirred aqueous medium of a lower temperature to obtain gelation and polymerizing the suspended gel into polymer blend beads.

According to a preferred embodiment of the manufacturing process the prepared solution of a temperature of at least 80° C. is suspended in a vigorously stirred aqueous medium of a temperature in the range of from 10-60° C. and preferably 10-30° C. to obtain gelation followed by suspension polymerization into polymer blend beads.

FIGS. I and II are graphical depictions of Dynamically Mechanical Thermal Analysis (DMTA) analyses of polymer compositions of the present invention.

The main solvent system to be used for the manufacture of the intermediate gel of the polyalkylene polymer may be selected from a variety of organic solvents. In general these solvents must be miscible with the vinyl aromatic monomer and must be able to dissolve the polyalkylene polymer. Preferably such solvents may be selected from linear or cyclic hydrocarbons, such as optionally branched alkanes, containing from 4 to 10 carbon atoms, cycloalkanes or aromatic hydrocarbons containing from 6 to 10 carbon atoms.

More preferably these solvents may be selected from n-butane, isobutane, isopentane, n-pentane, n-hexane, isohexane, n-heptane, isoheptane, n-octane, isooctane, n-nonane, cyclohexane, cyclooctane, benzene, toluene and xylenes, or mixtures thereof.

It will be appreciated that depending on the desired polymer blend beads to be prepared according to this preferred embodiment, the initially used main solvent or solvents have to be removed by evaporation after termination of the suspension polymerization and recovery of the beads, followed by impregnation of these beads with another solvent which can act as foaming agent to form expandable beads, if desired, or the initially used solvent or solvents can act themselves as foaming agent to form expandable beads, if desired.

In the latter case n-butane, isobutane, n-pentane, isopentane, n-hexane or isohexane or mixtures thereof are preferred as the main solvent. More preferably n-pentane or isopentane or mixtures thereof as used.

The starting mixture of main solvent or solvents and vinyl aromatic monomer may contain from 50-95% by weight of vinyl aromatic monomer and from 50-5% by weight of organic solvent and preferably 75-60% of weight by vinyl aromatic monomer and 25-40% by weight of solvent, based on the weight of the mixture of solvent(s) and monomer(s).

Suitable vinyl aromatic monomers may be selected from styrene, α-methylstyrene, o-methylstyrene, p-methylstyrene, bromostyrene, chlorostyrene, p-tert-butylstyrene, 1,3-dimethylstyrene, 3,5-diethylstyrene, 4-n-propylstyrene, 2,4,6-trimethylstyrene, 4-methylstyrene, 4-phenylstyrene and the like or mixtures thereof, of which styrene is the most preferred.

It will be appreciated that the vinyl aromatic monomer may be optionally mixed with polymeric co-constituents, which are compatible and completely miscible with these monomers. Examples of such polymeric co-constituents are polyphenylene ethers, wherein the free terminal hydroxy groups have previously been capped or blocked by conversion with a suitable capping agent selected from e.g. carboxylic acid anhydrides.

Examples of such conversions have been specified in e.g. copending British patent applications Nos. 8816197 and 8816330, the contents of which are included herein by way of reference.

Another group of suitable polymeric co-constituents are formed by block copolymers of poly(vinyl aromatic) and poly conjugated diene blocks of the type A-B or A-B-A, wherein A represents a polymer block of poly(vinyl aromatic), as specified hereinbefore and preferably styrene, and B represents a polymer block of poly conjugated diene, the monomers thereof being selected from 1,3-butadiene, 2-methyl-1,3-butadiene (isoprene), 2,3-dimethyl-1,3-butadiene, 1,3-pentadiene (piperylene), 1,3-hexadiene, 4-ethyl-1,3-hexadiene, 3-butyl-1,3-octadiene, 1-phenyl-1,3-butadiene and the like, of which 1,3-butadiene and/or isoprene are preferred, whereas block B is predominantly hydrogenated according to the most preferred embodiments. The weight average molecular weight of the respective blocks A and B may vary over a wide range, and the block copolymers are preferably linear.

The hereinbefore specified co-constituents may be added in amounts up to 30% by weight based on the weight of the vinyl aromatic monomer and preferably in an amount of from 5-15% by weight.

The usual poly(alkylene) polymers to be used for the process of the present invention may be selected from homopolymers or copolymers of ethylene; propylene; butene-1; pentene-1; 3-methylbutene-1; 4-methylbutene-1; 4-methylhexene-1; 5-methylhexene-1 or the like or a mixture of the homopolymers and/or copolymers. Polypropylene homopolymer is preferably used, while most preferably isotactic polypropylene, having a weight average molecular weight in the range of from 150,000 to 500,000 is used.

Preferably the poly(alkylene) polymers show a degree of crystallinity in the range of from 20 to 70% and more preferably from 40 to 60% as defined according to Burns, J. R. and Turnball, D., J. Appl. Phys. 37,4021 (1966).

The amount of poly(alkylene) to be dissolved and to be gelled in the starting mixture of main solvent and vinyl aromatic monomer(s), optionally containing additional co-constituents, may be in the range of from 5 to 30% by weight, based on the weight of the total mixture, and preferably in the range of from 5-15% by weight.

To the solution prepared according to the present invention, a radical forming initiator is added in an amount of from 0.5 to 2% by weight based on the weight of the vinyl aromatic monomer and dependent on the specific type of initiator to be applied in a certain case.

Suitable initiators may be selected from a great variety of monofunctional or polyfunctional peroxide compounds, azo compounds or azo-peroxide compounds, which are known per se for this purpose and commercially available.

Examples of such initiators are known e.g. U.S. Pat. No. 3,706,818 (polyperoxides); U.S. Pat. No. 3,725,455 (peroxy compounds containing a carbonate group); U.S. Pat. No. 3,746,735 (dispersters); U.S. Pat. No. 3,839,390 (polyperoxide); U.S. Pat. No. 3,686,102 (β-substituted diperoxyketals) and U.S. Pat. No. 3,812,095 (peroxide aliphatic axo compounds).

More specific examples of such suitable initiators are di-tert-butyloxy pivalate, di-decanoylperoxide, di-lauroylperoxide, di-acetylperoxide, di-tert-butylperoctoate, di-benzoylperoxide, di-tert-butylperacetate, di-tert-butylperoxy isopropylcarbonate, di-tert-butylperbenzoate, di-tert-butylperoxide, 1,1-bis-(tert-butylperoxy)-3,3,5-atrimethylcyclohexane, 1,4-di-(tert-butylperoxycarbonyl)cyclohexane, 2,5-dimethyl-2,5bis(benzoylperoxy)hexane, 1,1-bis(tert-butylperoxy)cyclohexane, di-tert-biutyldiperoxyazelate, or di-tert-butyldiperoxycarbonate. Di-larylperoxide, di-benzoylperoxide, di-tert-butylperbenzoate, di-tert-butylperoxy isopropyl-carbonate are preferred.

Although not being a preferred embodiment the polymerization step of the process of the present invention may also be carried out as polymerization in bulk, forming a polymer as a mass, in granulate form or in a finally desired formed article.

According to the preferred embodiments of the present invention the prepared intermediate poly(alkylene) polymer solution is added, after addition of the initiator, followed by homogenization at a temperature of at least 80° C., and more preferably at a temperature in the range of from 80-130° C., as a vigorously stirred aqueous medium, containing one or more suspending agents, to polymerize the suspended particles into polymer blend beads, having an average particle size in the range of from 5000 to 1500 μm.

Suitable suspending agents may be selected from a great variety of compounds which are generally known for this purpose, such as cellulose derivatives (e.g. Natrosol ®), tricalcium phosphate, magnesium pyrophosphate, vinyl-pyrrolidone, polyvinyl-alcohol, sodium dodecylbenzene sulphonate and the like, in an amount of from 0.01 to 5% by weight based on the amount of water.

The temperature of the aqueous medium is increased to start the polymerization depending on the specific initiator used.

The temperature may be further increased during the course of this polymerization step, however with the proviso that the poly(alkylene) polymer gel phase is not allowed to dissolve.

In order to reach economically attractive polymerization times, of at most 24 hours and preferably of from 1–10 hours, a gradual increase of the temperature may occur until a temperature in the final stage of 130° C. is reached.

It will be appreciated that all the thermal steps, occurring before the actual polymerization step, have to be carried out as fast as possible, in order to avoid the thermal polymerization of the vinyl aromatic monomer and the premature decomposition of the initiator after addition.

It will be appreciated that according to the most preferred embodiments of the present invention, polymer blend beads are obtained, in which the initially used main solvent(s) are still present in a substantially entrapped form and may be used later on to foam the expandable beads. However such expandable beads may also be reached via an alternative way by removing the initial main solvent(s) by evaporation under vacuo at temperatures not higher than 70° C. and impregnating the obtained beads with another foaming agent.

As a result of the hereinbefore described process novel thermoplastic beads are obtained which may be foamable, which have superior stability of preservation for the foaming agent i.e. the beads are capable of retaining the foaming agent for prolonged periods.

Moreover the beads show an increased elasticity or shock absorbance, an improved water resistance and a higher softening temperature.

It will be appreciated that the invention is also directed to stable interpenetrating polymer blend networks, obtainable by the process as described hereinbefore and to beads containing them.

Preferably the invention is also directed to such stable interpenetrating polymer blend networks comprising a polypropylene phase and a polyvinyl aromatic polymer phase, which optionally may contain a polyphenylene ether, wherein the free hydroxyl groups have previously been capped, and/or a block copolymer of poly(vinyl aromatic) and poly(conjugated diene) blocks of the type A-B or A-B-A, as specified hereinbefore.

More preferably the stable interpenetrating polymer blend networks comprise a polystryrene phase. A most preferred embodiment is formed by an expandable bead comprising an isotactic polyproylene phase, an atactic polystyrene phase and a foaming agent selected from n-butane, isobutane, n-pentane, isopentane, n-hexane or isohexane and more preferably n-pentane or ispentane or mixtures thereof.

It will be appreciated that another feature of the present invention is directed to the formation of shaped articles, manufactured from expandable beads, obtained by the hereinbefore specified process, by methods known per se, i.e. heating the beads and expansion and fusion to shaped articles.

The mechanical properties of interpenetrating polymer networks, prepared according to the present invention, are strongly related to the high blending degree of the respective polymer phases, i.e. the poly(alkylene) polymer phase (e.g. polypropylene) and the poly(vinyl aromatic) phase, the latter mainly occurring in the atactic form and the former forming the continuous phase.

This high blending degree in the finally obtained product can be shown by means of Dynamically Mechanical Thermal Analysis (DMTA) analysis, estimating the respective E and tan δ values of the polymers in the blend. DTMA measurements were carried out on samples, obtained to the process of the present invention, and from which the solvent was removed under vacuo at 70° C. in order to avoid melting of the polymer blend which might enable phase segregation of the immiscible polymer components. Measurements were carried out on bars sawn from polymer mass, prepared by bulk polymerization.

These DTMA measurements proceed along three identical steps, in which for each sample the path of the storage modulus E' and tan δ are recorded between room temperature and 140° C. to 150° C.

In order to avoid a significant weakening of the material, these temperature limits are intentionally kept under the melt temperature of the isotactic polypropylene in the tested samples.

The measurements were performed by using a Polymer Laboratories DMTA equipment. A bar of the sample to be tested is clamped on one side in the measuring head and subjected to a bending frequency of 1 Hz at a deformation of 62.5 μm. By using a thermoplastic jacket which can be placed over the measuring-head the sample may be analyzed in a temperature range of from −100° C. to 200° C., whereby the measuring rate is 2° C./min.

It will be appreciated that another feature of the present invention relates to the thermoreversible stable polymer gel compositions comprising the (polyalkylene) polymer, the organic main solvent or solvents, the vinyl aromatic monomer(s) and at least one radical forming initiator, as specified hereinbefore, which may be converted into the desired stable interpenetrating polymer blend network by subsequent polymerization of the vinyl aromatic monomer(s).

More preferably these gel compositions of the present invention comprise:

(a) an organic main solvent selected from butane, isobutane, isopentane, n-pentane, n-hexane, isohexane, or mixtures thereof and more preferably n-pentane or isopentane or mixtures thereof, in an amount of from 5 to 50% mixed with one or more vinyl aromatic monomers selected from styrene; α-methylstyrene; o-methylstyrene; p-methylstyrene; p-tert-butylstyrene; 1,3-dimethylstyrene, 3,5-diethylstyrene; 4-n-propylstyrene; 2,4,6-trimethylstyrene; 4-methylstyrene; 4-phenylstyrene and the like, and more preferably styrene monomer, in an amount of from 50 to 95% by weight based on the weight of the complete mixture, and (b) a plyalkylene polymer selected from homopolymers or copolymers of ethylene; propylene; butene-1; pentene-1; 3-methylbutene-1; 4-methylbutene-1; 4-methylhexene-1; 5-methylhexene-1; or the like, and more preferably isotactic polypropylene, in an amount of from 5 to 30% by weight based on the weight of the mixture (a), (c) mixed with 0.5-2% by weight of at least one radical forming initiator based on the weight of the alkenyl aromatic monomer this initiator being selected from di-tert-butyloxy pivalate; di-decanoyl peroxide; di-lauryl peroxide; di-acetyl peroxide; di-tert-butyl peroctoate, di-benzoylperoxide, di-tert-butyl-peracetate, di-tert-butyl peroxy isopropylcarbonate, di-tert-butylperbenzoate; di-tert-butylperoxide; 1,1bis(tert-butyl-peroxy)-3,3,5-trimethylcyclohexane; 1,4-di(-tert-butylperoxy-carbonyl)hexane; 2,5-dimethyl-2,5bis(benzoylperoxy)hexane; 1,1-bis(tert-butyl-peroxy)cyclohexane; di-tert-butyldiperoxyazelate or di-tert-butyldiperoxycarbonate, of which di-benzoylperoxide, di-laurylperoxide, di-tert-butylperbenzoate, or di-tert-butylperoxy isopropylcarbonate are preferred.

The invention may be illustrated by the following examples, however without restricting the scope of the invention to these embodiments.

EXAMPLE 1

A 10% by weight solution of isotactic polypropylene in a mixture of 76 parts by weight of styrene and 24 parts by weight of n-octane is prepared and homogenized at a temperature of 130° C.-149° C.. The solution is cooled to 80° C. as quick as possible to avoid crystallization and gel formation of the polypropylene.

At this temperature dibenzoylperoxide is added in a ratio of 0.096 g initiator per 29.4 ml solvent-monomer mixture whereafter the solution is mechanically homogenized. The obtained mixture is quickly cooled to ambient temperature causing gelation of the isotactic polypropylene in the mixture.

The obtained gel being swollen to 90% with the mixture of 76 parts by weight of styrene and 24 parts by weight of n-octane is subsequently heated to 90° C., on which temperature the radical polymerization of styrene is continued at least 24 hours.

The polymerization temperature was smoothly increased during this reaction step to at most 110° C., under the proviso that the isotactic polypropylene is not dissolved. Subsequently the formed material is cooled down to room temperature.

The obtained blend contains after quantitative conversion 87.2% by weight of atactic-polystyrene and 12.8% by weight of isotactic polypropylene. From a sample of this blend, the atactic polystyrene is selectively dissolved and after removal of the n-octane, the residue is subjected to gel permeation chromatography showing a weight average molecular weight of $220 \times 10^3$ kg/kmol, having a distribution of Mw/Mn of 3.6.

Samples of the obtained polymer blend from which the n-octane had previously been removed, were subjected to DMTA experiments, to record the path of the storing modulus E' and tan δ between room temperature and 140° C.-150° C., leading to the typical FIGS. I and II.

EXAMPLE 2

A solution mixed with di-benzoylperoxide as prepared according to Example 1, at a temperature of 90° C. is suspended in a vigorously stirred aqueous medium containing 5.4 g of Natrosol ® per litre of water, by supplying mechanical energy in an average amount of 0.75 kW/m³ aqueous medium.

The temperature was smoothly increased to 105°) C. and polymerization was continued for 10 hours.

The obtained beads were recovered in the usual way.

EXAMPLE 3

A gel composition is prepared by preparation of a 15% solution of isotactic polypropylene in a mixture of 90 parts by weight of styrene and 10 parts by weight of n-pentane which is homogenized at a temperature of 140° C.

The solution is cooled to 85°0 C. as quick as possible. At this temperature dibenzoylperoxide is added in ratio of 0.4 g initiator per litre of solvent-monomer mixture, whereafter the mixture is mechanically homogenized at 90° C. and suspended in a vigorously stirred aqueous medium at 40° C. containing 5.4 g of Natrosol ® per m³ water, by supplying mechanical energy in an average amount of 0.75 kW/m³ aqueous medium.

The temperature was smoothly increased to 120° C. and the polymerization was continued for 10 hours.

The obtained beads were recovered in the usual way. They can be foamed with steam of 110° C.

We claim:

1. A process for the preparation of stable interpenetrating polymer blend networks, said process comprising the steps of:
   preparing a solution of a poly(alkylene) polymer by dissolving said poly(alkylene) polymer at an elevated temperature in an admixture of at least one organic solvent and at least one vinyl aromatic monomer,
   cooling said solution to a temperature less than or equal to 80° C.,
   adding a radical-forming initiator for the polymerization of said at least one vinyl aromatic monomer,
   homogenizing said solution,
   cooling said solution to a temperature sufficient to result in the gelation of the poly(alkylene) polymer in the solution,
   heating the obtained gel to a temperature of at least 80° C. and polymerizing said at least one vinyl aromatic monomer.

2. The process of claim 1, wherein said organic solvent is selected from the group consisting of n-butane, isobutane, n-pentane, isopentane, n-hexane, isohexane, and mixtures thereof.

3. The process of claim 1, wherein said vinyl aromatic monomer is admixed with a compatible polymer in said solution.

4. The process of claim 3, wherein said compatible polymer is selected from the group consisting of a block copolymer of the type A-B and a block copolymer of the type A-B-A, wherein A is a polymer block of a poly(vinyl aromatic) and B is a polymer block of a poly(conjugated diene).

5. The process of claim 1, wherein said poly(alkylene) polymer exhibits a degree of crystallinity in the range of from 20 to 70%.

6. A process for the preparation of stable interpenetrating polymer blend networks, said process comprising the steps of:
   preparing a solution of a poly(alkylene) polymer of dissolving said poly(alkylene) polymer at an elevated temperature in an admixture of at least one organic solvent and at least one vinyl aromatic monomer,
   cooling said solution to a temperature less than or equal to 80° C., adding a radical-forming initiator for the polymerization of said at least one vinyl aromatic monomer, homogenizing said solution, suspending said solution in a vigorously stirred aqueous medium having a lower temperature to cause gelation of said poly(alkylene) polymer, and polymerization said at least one vinyl aromatic monomer to obtain beads of a polymer blend.

7. The process of claim 6, wherein said organic solvent is selected from the group consisting of n-butane, isobutane, n-pentane, isopentane, n-hexane, isohexane, and mixtures thereof.

8. The process of claim 6, wherein said vinyl aromatic monomer is admixed with a compatible polymer in said solution.

9. The process of claim 8, wherein said compatible polymer is selected from the group consisting of a block copolymer of the type A-B and a block copolymer of the type A-B-A, wherein A is a polymer block of a poly(vinyl aromatic) and B is a polymer block of a poly(conjugated diene).

10. The process of claim 6, wherein said poly(alkylene) polymer exhibits a degree of crystallinity in the range of from 20 to 70%.

11. The process of claim 6, wherein said vigorously stirred medium has a temperature in the range of from 10° to 60° C.

12. The process of claim 11, wherein the temperature of said medium ranges from 10° to 30° C.

13. The process of claim 1, wherein said organic solvent is selected from the group consisting of linear or branched hydrocarbons containing from 4 to 10 carbon atoms, cycloalkanes containing from 6 to 10 carbon atoms, and aromatic hydrocarbons containing from 6 to 10 carbon atoms.

14. The process of claim 6, wherein said organic solvent is selected from the group consisting of linear or branched hydrocarbons containing from 4 to 10 carbon atoms, cycloalkanes containing from 6 to 10 carbon atoms, and aromatic hydrocarbons containing from 6 to 10 carbon atoms, 15. The process of claim 1, wherein said admixture of organic solvent and vinyl aromatic monomer comprises from 75-60% by weight of vinyl aromatic monomer and from 25-40% by weight of solvent.

16. The process of claim 6, wherein said admixture of organic solvent and vinyl aromatic monomer comprises from 75-60% by weight of vinyl aromatic monomer and from 25-40% by weight of solvent.

17. The process of claim 1, wherein said vinyl aromatic monomer comprises styrene.

18. The process of claim 6, wherein said vinyl aromatic monomer comprises styrene.

19. The process of claim 3, wherein said vinyl aromatic monomer is employed in admixture with a polyphenylene ether, the free hydroxyl groups of which are capped.

20. The process of claim 8, wherein said vinyl aromatic monomer is employed in admixture with a polyphenylene ether, the free hydroxyl groups of which are capped.

21. The process of claim 4, wherein said A block comprises styrene.

22. The process of claim 9, wherein said A block comprises styrene.

23. The process of claim 4, wherein said B block is selected from the group consisting of 1,3-butadiene and isoprene.

24. The process of claim 9, wherein said B block is selected from the group consisting of 1,3-butadiene and isoprene.

25. The process of claim 4 wherein said B blocks are hydrogenated.

26. The process of claim 9, wherein said B blocks are hydrogenated.

27. The process of claim 4, wherein said copolymers comprise linear block copolymers.

28. The process of claim 9, wherein said copolymers comprise linear block copolymers.

29. The process of claim 1, wherein said poly(alkylene) polymer is selected from the group consisting of homopolymers and copolymers of ethylene, propylene, butene-1, pentene-1, 3-methylbutene-1, 4-methylbutene-1, 4-methylhexene, 5-methylhexene-1 and mixtures thereof.

30. The process of claim 6, wherein said poly(alkylene) polymer is selected from the group consisting of homopolymers and copolymers of ethylene, propylene, butene-1, pentene-1, 3-methylbutene-1, 4-methylbutene-1, 4-methylhexene, 5- methylhexene-1 and mixtures thereof.

31. The process of claim 28, wherein said poly(alkylene) polymer comprises isotactic polypropylene.

32. The process of claim 29, wherein said poly(alkylene) polymer comprises isotactic polypropylene.

33. The process of claim 30, wherein the molecular weight of said polypropylene is in the range of from 150,000 to 500,000.

34. The process of claim 30, wherein the molecular weight of said polypropylene is in the range of from 150,000 to 500,000.

* * * * *

UNITED STATES PATENT AND TRADEMARK OFFICE
CERTIFICATE OF CORRECTION

PATENT NO. : 5,084,513
DATED : January 28, 1992
INVENTOR(S) : JOHANNES M. ZIJDERVELD ET AL.

It is certified that error appears in the above-identified patent and that said Letters Patent is hereby corrected as shown below:

On the title page, in the Abstract, line 9, "homogenizig" should read --homogenizing--.

Column 8, line 62, "polymer of" should read --polymer by--; and

Column 9, line 7, "polymerization" should read --polymerizing--.

Column 10, line 41, "28" should read --29--.

Column 10, line 43, "29" should read --30--.

Column 10, line 45, "30" should read --31--.

Column 10, line 48, "30" should read --33--.

Signed and Sealed this

Twenty-first Day of September, 1993

Attest:

BRUCE LEHMAN

Attesting Officer     Commissioner of Patents and Trademarks